Oct. 4, 1932.  H. BELSON  1,881,124
COLLAR ATTACHMENT
Filed May 18, 1931
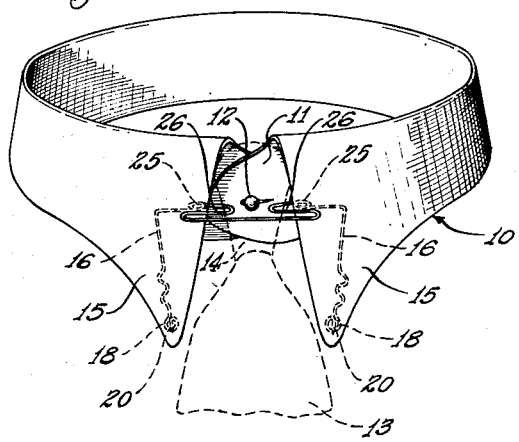
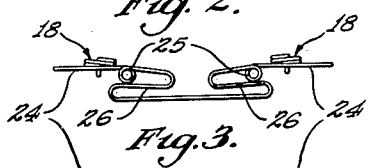
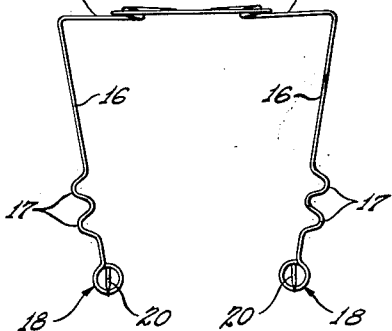
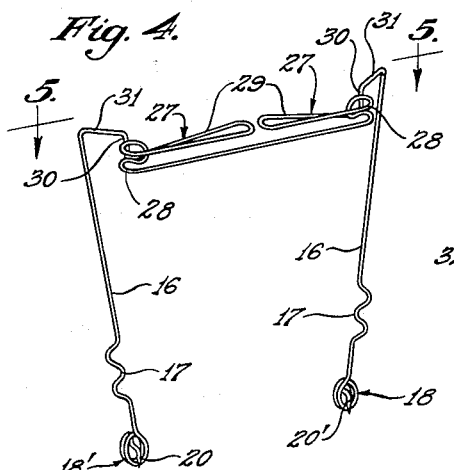
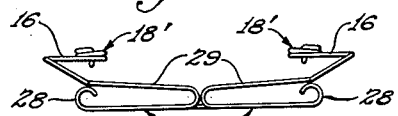
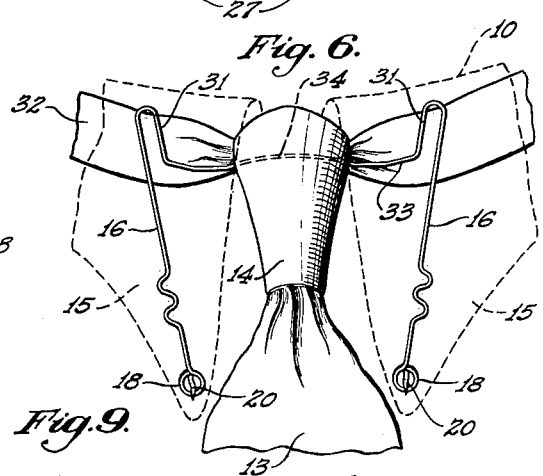
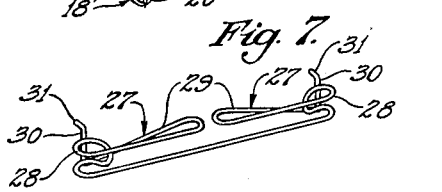
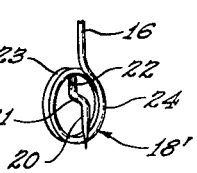
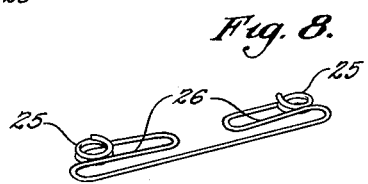
*Herman Belson.*
INVENTOR
BY *Victor J. Evans & Co.*
HIS ATTORNEYS Patented Oct. 4, 1932

1,881,124

UNITED STATES PATENT OFFICE

HERMAN BELSON, OF CHICAGO, ILLINOIS

COLLAR ATTACHMENT

Application filed May 18, 1931. Serial No. 538,285.

This invention relates to certain novel improvements in collar attachments, and has for its principal object the provision of an improved construction of this character which will be highly efficient in use and economical in manufacture.

It is an object of this invention to provide an improved device for keeping the wings of a turndown collar in a neat and attractive condition and to prevent wrinkling and creasing thereof when in use.

The invention embodies clamping jaws which in use engage the wings of the collar, and it is an object of this invention to construct these jaws in such a manner that they will engage the collar wings and hold the same in place without creasing or wrinkling the portions of the wings engaged by the clamping jaws.

It is another object of the invention to provide a stiffening device for the wings of a turndown collar and to construct the device in such a manner that the wings of the collar will not creep thereupon so that the device will at all times stiffen and retain the wings in a neat and attractive condition.

Other objects will appear hereinafter.

The invention consists in the novel combination and arrangement of parts to be hereinafter described and claimed.

The invention will be best understood by reference to the accompanying drawing showing the preferred form of construction, and in which:

Fig. 1 is a perspective view of a typical turndown collar showing one form of the invention attached thereto;

Fig. 2 is a top plan view of the invention as shown in Fig. 1;

Fig. 3 is a front elevational view of the form of invention shown in Figs. 1 and 2;

Fig. 4 is a perspective view of a modified form of construction;

Fig. 5 is a top plan view of the form of invention shown in Fig. 4 and on line 5—5 in Fig. 4;

Fig. 6 is a front elevational view of another modified form of construction of the invention;

Fig. 7 is a perspective detail view of the clamping jaws embodied in the invention as shown in Figs. 4 and 5;

Fig. 8 is a perspective detail view of the clamping jaws embodied in the form of invention shown in Figs. 1, 2 and 3;

Fig. 9 is a perspective view of one form of construction of the piercing points which engage the wings of the collar; and Fig' 10 is a perspective view of another form of construction of the piercing points.

The present invention is an improvement over my copending U. S. application on a collar stiffening and retaining device, Ser. No. 470,968, filed July 26, 1930.

In the drawing, a collar of the turndown style is indicated at 10 and includes the neckband 11 detachably joined at its ends by the usual collar button 12 and this collar has the conventional wings 15. Diagrammatically shown is a conventional type of tie 13, embodying the knot 14.

Referring to Figs. 1, 2, 3 and 10, it will be seen that the invention provides arms 16 which are provided with the curved portions 17 to increase their resiliency, similar reference numerals being used in all of the figures to indicate like parts. At their ends the arms 16 are wound into a coil 18, the windings of which are soldered together as at 19, Fig. 10, and these coils terminate in piercing points or tongues 20 which engage the wings 15 of the collar on the inner sides thereof. Experience teaches that in the prior art the fabric of the wings 15, in use, has had a tendency to "creep" or "crawl" up the points 20 and around the windings of the coil 18 with consequent wrinkling of the collar wings. In the form of construction of these points illustrated in Fig. 10, I overcome this by soldering together the windings of the coils 18, as at 19, while in the form of construction of the piercing points illustrated in Figs. 4 and 9 the piercing points 20' are provided with an offset 21 which is continuous with the portion 22 that extends from the rear coil winding 23 under the winding 24, and in use the collar wings are prevented from "creeping" or "crawling" up into the coil windings by engagement with the offset portions 21 of the piercing points 20'.

Referring now particularly to Figs. 1, 2, 3 and 8, it will be seen that the portions 35 extend toward each other from the arms 16, and under the collar wings, in use. These portions 35 are continuous with coil windings or springs 25 and the clamping jaws 26. In use, the jaws 26 are disposed at the front of the collar wings and the wings are engaged, as shown in Fig. 1, between the coils 25 and the jaws 26. By reason of the spring action or resiliency of coils 25, the jaws 26 are caused to abut the coils 25 and bind the collar wings therebetween without interlocking with said coils and thus preventing creasing or wrinkling of the collar wings. Heretofore in the art collar stiffening and retaining devices have been objectionable because of the fact that they have always had a tendency to wrinkle or crease the wings of the collar by the crossing or interlocking of the clamping jaws arms, and from the foregoing description it will be seen that the present invention overcomes this objectionable feature of the prior art.

The modification illustrated in Figs. 4 and 5 accomplishes the hereinbefore described advantages of the clamping jaws by a somewhat different arrangement of the clamping jaws, indicated generically at 27. Each of the clamping jaws 27 includes a coil 28 and a movable arm or jaw 29 to which resiliency is given by the reverse bends in the jaws 29. Each arm 29 has an offset 30 which is connected, by way of portion 31, with the corresponding arm 16 and in use the wings 15 of the collar are disposed between the coils 28 and the offsets 30. By reason of the arrangement of the offsets and coils 28 (Figs. 4, 5, and 7) the wings of the collars when disposed and held between these coils and offsets will not be creased or wrinkled since the offsets cannot enter into the folds of the coils 28.

In Fig. 6 the arms 16 are bent back upon themselves, at their upper ends, to provide the U-shaped portions 31 which lie against the neckband 32 of the tie 13 and on the front side thereof, when in use. These U-shaped portions 31 are interconnected by a cross piece 33 which is provided with a curved portion 34 to receive the knot 14 of the tie, so that when the points 20 are sunk into the collar wings 15 both collar and tie will be held neatly and firmly in place.

From the foregoing description it is apparent that the invention provides improved collar stiffening and retaining devices which will effectively hold or secure a turndown collar neatly in place without wrinkling or creasing the collar in so doing.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A device for holding the wings of a turndown collar neatly in place, comprising resilient clamping jaws adapted to engage said wings and including means for preventing creasing of the wings by such engagement, arms attached to said jaws and piercing points carried thereby for detachable engagement with said wings on the inner sides thereof.

2. A device for holding the wings of a turndown collar in place, comprising clamping jaws for engaging said wings, each of said jaws including resilient arms urged toward each other to bind the collar wing therebetween, and means on said arms for preventing the interlocking or crossing thereof and consequent creasing of the collar wing, arms attached to said jaws including piercing elements for engagement with the wings, and means on the last named arms to prevent the fabric of the wings from "creeping" up and past said points onto the last named arms.

3. In devices for holding the wings of a turndown collar in place, a member including arms and piercing points on said arms for engagement with said wings, convolutions in said arms adjacent the piercing points, and means on said arms for preventing the fabric of said wings from "creeping" or "crawling" up said points between the convolutions onto said arms when said points are engaged with said wings.

4. A device for holding the wings of a turndown collar in place, comprising clamping jaws for engaging said wings, each of said jaws including resilient arms urged toward each other to bind the collar wing therebetween, means on said arms for preventing the interlocking or crossing thereof and consequent creasing of the collar wing, said device including other arms attached to said jaws, piercing points or tongues on said second named arms for detachable engagement with said wings, and means on said second named arms for preventing the fabric of said wings from "creeping" or "crawling" up said tongues onto said second named arms when said tongues are engaged with said wings.

5. An attachment for collars having wings comprising a member including arms and piercing elements on said arms for engagement with said wings, looped portions on said arms adjacent the piercing elements, means on said arms for preventing the fabric of the wings from working up and past said elements between said looped portions when said elements are engaged with the wings, and said member including clamping jaws for engaging said wings.

6. An attachment for collars having wings comprising a member including arms and piercing elements on said arms for engagement with said wings, looped portions on said arms adjacent the piercing elements, and means securing the looped portions together for preventing the fabric of the wings from working up and past the piercing elements between the looped portions when the piercing elements are engaged with the wings.

7. An attachment for collars having wings comprising a member including arms and piercing elements on said arms for engagement with said wings, looped portions on said arms adjacent the piercing elements, and means on said arms for preventing the fabric of the wings from working up and past said elements between said looped portions when said elements are engaged with the wings, said means including offset portions in the arms between the piercing elements and the looped portions.

8. An attachment for collars having wings comprising a member including arms and piercing elements on said arms for engagement with said wings, looped portions on said arms adjacent the piercing elements, and means securing the looped portions together for preventing the fabric of the wings from working up and past the piercing elements between the looped portions when the piercing elements are engaged with the wings, and said member including clamping jaws for engaging said wings.

9. An attachment for collars having wings comprising a member including arms and piercing elements on said arms for engagement with said wings, looped portions on said arms adjacent the piercing elements, means on said arms for preventing the fabric of the wings from working up and past said elements between said looped portions when said elements are engaged with the wings, said means including an offset portion in the arms between the piercing elements and the looped portions, and said member including clamping jaws for engaging said wings.

In testimony whereof I affix my signature.

HERMAN BELSON.